United States Patent [19]
Golab

[11] Patent Number: 6,087,934
[45] Date of Patent: Jul. 11, 2000

[54] VELOCITY-DISCRIMINATING CABLE MOTION TRANSDUCER SYSTEM

[76] Inventor: Thomas Golab, 3 Post Oak Dr., St. Peters, Mo. 63376

[21] Appl. No.: 08/998,513

[22] Filed: Dec. 26, 1997

[51] Int. Cl.[7] .................................................. G08B 21/00
[52] U.S. Cl. ..................... 340/540; 340/670; 340/677; 340/853.3; 340/870.04
[58] Field of Search ............................. 340/540, 870.16, 340/870.04, 853.3, 853.2, 854.9, 673, 675, 676, 677, 670; 198/502.4, 502.1, 810.02; 73/152.43

[56] References Cited

U.S. PATENT DOCUMENTS

| | | | |
|---|---|---|---|
| 3,626,956 | 12/1971 | Sauder | 340/673 |
| 3,648,267 | 3/1972 | Lavarenne | 340/263 |
| 3,743,913 | 7/1973 | Rebucci | 340/673 |
| 3,838,341 | 9/1974 | Gaines | 324/161 |
| 3,859,629 | 1/1975 | Komiyama et al. | 340/62 |
| 3,882,474 | 5/1975 | Cain | 340/177 |
| 4,128,886 | 12/1978 | Woolston | 340/673 |
| 4,128,888 | 12/1978 | Sheldon et al. | 364/565 |
| 4,367,459 | 1/1983 | Amir et al. | 340/541 |
| 4,736,194 | 4/1988 | Sticksel | 340/541 |
| 4,807,162 | 2/1989 | Shibayama et al. | 364/552 |
| 5,236,144 | 8/1993 | Kautz | 242/107 |
| 5,341,129 | 8/1994 | Wilson et al. | 340/670 |
| 5,371,488 | 12/1994 | Couch et al. | 340/541 |

*Primary Examiner*—Nina Tong
*Attorney, Agent, or Firm*—Grant D. Kang; Thompson Coburn, LLP

[57] ABSTRACT

A system for monitoring motion includes a cable-encoder combination to create an electrical signal indicating distance and a microprocessor monitoring system to provide time measurement in conjunction with distance information and to provide alarms whenever predetermined limits are exceeded. The system provides a teaching mode for teaching the predetermined limits, and provides a velocity adaptive mode in which a certain informational values may be adjusted over fixed time periods to provide for moving references.

21 Claims, 12 Drawing Sheets

VELOCITY-DISCRIMINATING CABLE MOTION TRANSDUCER SYSTEM

BACKGROUND OF THE INVENTION

1. Field of the Invention

This invention relates to industrial presence sensor systems and, more specifically, to cable motion detection systems.

2. Related Art

High volume manufacturing processes move large numbers of production units through manufacturing lines. One example of such a process is baked goods. High numbers of loaves of bread are processed in a manufacturing plant. These loaves are transported by conveyor belt from operation to operation. During transportation, for various reasons such as jamming an error will occur and the loaves will fall off the conveyor belt. Alternatively, empty bread pans may jam. Empty bread pans are cooled off on long conveyors before coming back to be reused. When these bread pans jam, the bread pans become damaged from falling off the conveyor or from hitting each other and must be replaced. Alternatively, the pans jam machinery (equipment), damaging the equipment such that it must be repaired or replaced. If the problem is not corrected quickly, or if the manufacturing line is not stopped quickly, a great number of loaves of bread and/or bread pans will fall on the floor or jam equipment. These loaves and damaged bread pans must then be discarded, while the equipment can require repair or replacement. This results in higher manufacturing costs.

Because these lost bread pans are considered pure waste and because a very large number of bread pans (and loaves) can be lost, it is critical that any falling bread pans be identified as quickly as possible. Accordingly, one means of identifying conditions when bread pans are falling is to add alarms at trouble points, instruct the existing employees to watch for the alarms in addition to their regular duties. However, any losses from the failure to recognize alarms are simply absorbed. Thus, it is a forgone conclusion that a loss will occur, and the major challenge is managing the extent of the loss.

Though the above example relates to the bakery process, the illustrated problem is common to many high volume manufacturing processes.

Accordingly, there is a need in the art to provide a system which will enable an automatic means for monitoring the status of the material involved in the manufacturing processes.

An optical emitter/detector pair system produces a long beam that is interrupted whenever an object moves between the emitter and the detector. These systems are difficult to align and keep aligned. In addition, once in place, the beams are not visually apparent and thus individuals who are moving may walk between the emitter and detector, setting off false alarms. Further, optical sensors have difficulty with wet, dusty, hot, corrosive or otherwise extreme conditions. An area of particular difficulty for optical sensors is transparent targets, many of which cannot be reliably detected using common light sources. Moreover, because optical sensors are practically limited to line-of-sight beams, an array of detectors and emitters must be utilized if it is desired to detect an object crossing anywhere through a plane in space. Theoretically, mirrors may be used to expand the area of coverage, but alignment, signal strength, environmental factors, and maintenance issues make the use of mirrors less attractive.

In certain instances, information regarding the status of the manufacturing process may be determined by obtaining information on the speed of the conveyor belt. If the conveyor belt is jammed, the speed may be zero, and a problem arises. U.S. Pat. No. 3,743,913 issued to Rebucci discloses a mechanism for electrically transmitting the speed of a conveyor belt. However, if a problem such a jamming occurs which may cause manufactured articles to fall off the conveyor belt the belt speed is not affected, and no information is developed. Vehicle speed detectors which provide an alarm for excessive speed generally are of course well known in the art, as in U.S. Pat. Nos. 3,648,267, and 3,859,629.

U.S. Pat. No. 3,838,341 issued to Gaines discloses a detection system for determining unacceptable deviations from a desired spacing pattern in the passage of articles past a station. This solution is limited to checking the status at only one point. If multiple points are needed, multiple devices are required. Also, an entire area cannot be checked, given the constraint that only the status of a particular point can be checked. In addition, the existence of a desired spacing pattern is a prerequisite of such a detection system, while such a spacing pattern in fact does not exist for many production lines.

Wire-type sensors and detectors for determining the presence of various articles are also known. For example, U.S. Pat. No. 4,367,459 discloses a taut wire intrusion detection system in which an actuator is connected to a group of tensioned wires. A force transducer outputs an electrical signal proportional to the force applied to the actuator; when the force exceeds a predetermined threshold, an alarm is activated.

In another example, U.S. Pat. No. 4,736,194 discloses a fence with security wires fastened to posts via sensors. An alarm signal is generated when only one or only a few security wires move slowly. However, these slow movements are ignored when caused by environmental factors such as changes in temperatures and wind forces because the signal amplitudes of the sensors are drawn up to a mean value and only threshold deviations from the mean value create an alarm situation. One mode compares the tension of one wire with the average tension of a group of wires to ignore slow noise sources. Another mode compares the time rate of change of wire tension to a threshold value. This reference does not teach or suggest the use of time rate of change of position.

In yet another example, U.S. Pat. No. 4,929,926 discloses an intrusion detection barrier utilizing a coiled wire fence and a sensor wire tensioned between a pair of ground wires. The sensor wire, which is connected to an intrusion detector, is free to move along its longitudinal axis, but is not free to move transversely. The intrusion detector may be of the force sensing type or of the pull switch type.

Similarly, U.S. Pat. No. 5,371,488 discloses a tension sensing security apparatus which senses variation in the longitudinal tension in taut wire and produces a tension signal which is transmitted to a central monitoring location. While in the general area of cable tension transducers, none of these references teach or suggest applications of the technology to the area of high volume manufacturing processes. The general class of cable pull switches (an industrial product often used to trigger manual safety alarms) suffer from significant limitations: they are not very sensitive; they are limited in cable length to around 100 feet; they do not move out of the way of an object; and they can be deactivated by mechanical failures.

U.S. Pat. No. 5,236,144 discloses a cable extension linear position transducer which has an integrated support structure, a potentiometer having a shaft, a drum affixed to the shaft and a tension spring. This type of transducer has been used in conjunction with industrial limit alarms to signal when an absolute limit has been reached. However, these applications rely on the inherent accuracy and repeatability of these precision instruments, and do not adaptively filter out the noise sources that more strongly affect longer, lower stiffness cables or lines. Precise measurement of the linear movement of an item is provided by this invention, but no other applications of this technology in other arts are either taught or suggested.

U.S. Pat. No. 3,882,474 discloses a system for monitoring the instantaneous velocity of a pipe string being tripped relative to a well bore. Specifically, the invention discloses a unit which derives an electrical signal as a function of instantaneous pipe speed, and a monitoring system which compares signals representative of instantaneous velocities and provides an alarm when predetermined velocity limits are exceeded. There is no automatic adaptation to changing conditions disclosed or suggested by this reference.

U.S. Pat. No. 4,128,888 discloses a velocity control system for an oil drilling rig which gathers information on certain indices and compares that information against certain predetermined threshold values. If certain values are exceeded, output signals or alarm signals are generated. The information gathered is of actual velocity and direction of travel, and the predetermined thresholds relate to minimum and maximum velocities, and direction of travel. Output signals are generated when the actual velocity is not within the minimum and maximum thresholds, or when the direction of travel deviates from the predetermined direction of travel.

SUMMARY OF THE INVENTION

It is in the view of the above problems that the present invention was developed. The invention is a system for monitoring cable motion that includes a cable-encoder combination to create an electrical signal indicating distance and a microprocessor monitoring system to provide time measurement in conjunction with distance information and to provide alarms whenever predetermined limits are exceeded. The system provides a teaching mode for teaching the predetermined limits, and provides a velocity-adaptive mode in which certain informational values may be adjusted over fixed time periods to provide for moving references. In the teaching mode, the microprocessor software learns a limit for that position value from an example the user gives it by moving the sensing line. In run mode, the microcontroller reads the encoder and keeps a current position output value after subtracting off any motions that occur below a user-specified speed. If this value exceeds the taught position value limit, an alarm is produced. Accordingly, slow length changes are rejected.

More specifically, the invention is a velocity-discriminating and position threshold cable transducer system which has a tensioned cable in contact with a spool. When the cable is moved, the spool is rotated. The spool communicates with a digital encoder. The encoder reads the distance traveled and communicates the information to a microprocessor.

In this invention, a position threshold may appear to be a moving value over time. A new relative value for the position threshold is obtained by subtracting up to one position unit from any displacement occurring within a selected time interval. Accordingly, the system can be very sensitive to the amount of motion produced by a slight lateral displacement of the sensing line because it rejects the kind of slow length changes in the sensing line that would require wide limits to be set if one were using pure displacement sensing. Slow length changes could be a result of many factors, including temperature expansion/contraction cycles, humidity shrink/stretch cycles, aging stretch, settling & temperature effects of the building and equipment to which the sensing line is mounted, weakening of springs used to keep sensing line tension, etc. In addition, the system of the present invention is advantageous in that it provides the ability to reject the presence of slow motion in either objects or mounting points for the sensing line.

Velocity is calculated by knowing the amount of time elapsed between two different cable positions. The low velocity rejection feature is implemented by subtracting up to one position unit from any motion that happens within a selected time interval. This produces a new virtual or relative output of the encoder/potentiometer that has any motion below the selected amount already subtracted off. This derived virtual output is basically in the form of a set of positions over time, just like the original outputs. Accordingly, anything that could be done to the original outputs can be done to this derived output. That is why a threshold for the alarm can be set for a position value, as in the preferred invention, or a velocity, as in the less preferred invention. Velocity can be calculated from this derived output as change in position over a time interval.

In another embodiment, the microprocessor determines the velocity and compares it against a preset velocity threshold. If the velocity threshold is exceeded, an output is generated in the form of an alarm signal.

In yet another embodiment, the system utilizes a constant velocity timer wheel connected to the cable such that one of two square wave edges is generated by the encoder periodically, and that creates an alarm signal output in the absence of square wave changes.

The system further comprises seven separate modes: an initialization module, a mode configuration module, a limit-learner module, a sensor reader module, a slow motion rejector module, a limit checker module, a health monitor module, and an alarm driver module. The limit-learner module implements a teaching mode in which the cable is displaced by a user to the minimum distance that detection is desired; the system will read the value and set it to the new position threshold.

A wide variety of materials can be selected for the sensing line to allow the sensor system to work in hot, corrosive, underwater, or other difficult environments. The line can then simply be run out of that environment using a mechanical coupling, to attach to the line position transducer component of the present invention. Moreover, dusty, wet environments and transparent target objects can be easily tolerated by the system of the present invention.

Further features and advantages of the present invention, as well as the structure and operation of various embodiments of the present invention, are described below in detail with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings:

FIG. 6a illustrates a side plan view of a gearmotor timer embodiment of the present invention;

FIG. 6b illustrates a front plan view of the gearmotor timer embodiment of FIG. 6a;

DETAILED DESCRIPTION OF THE PREFERRED EMBODIMENTS

Figure 1:
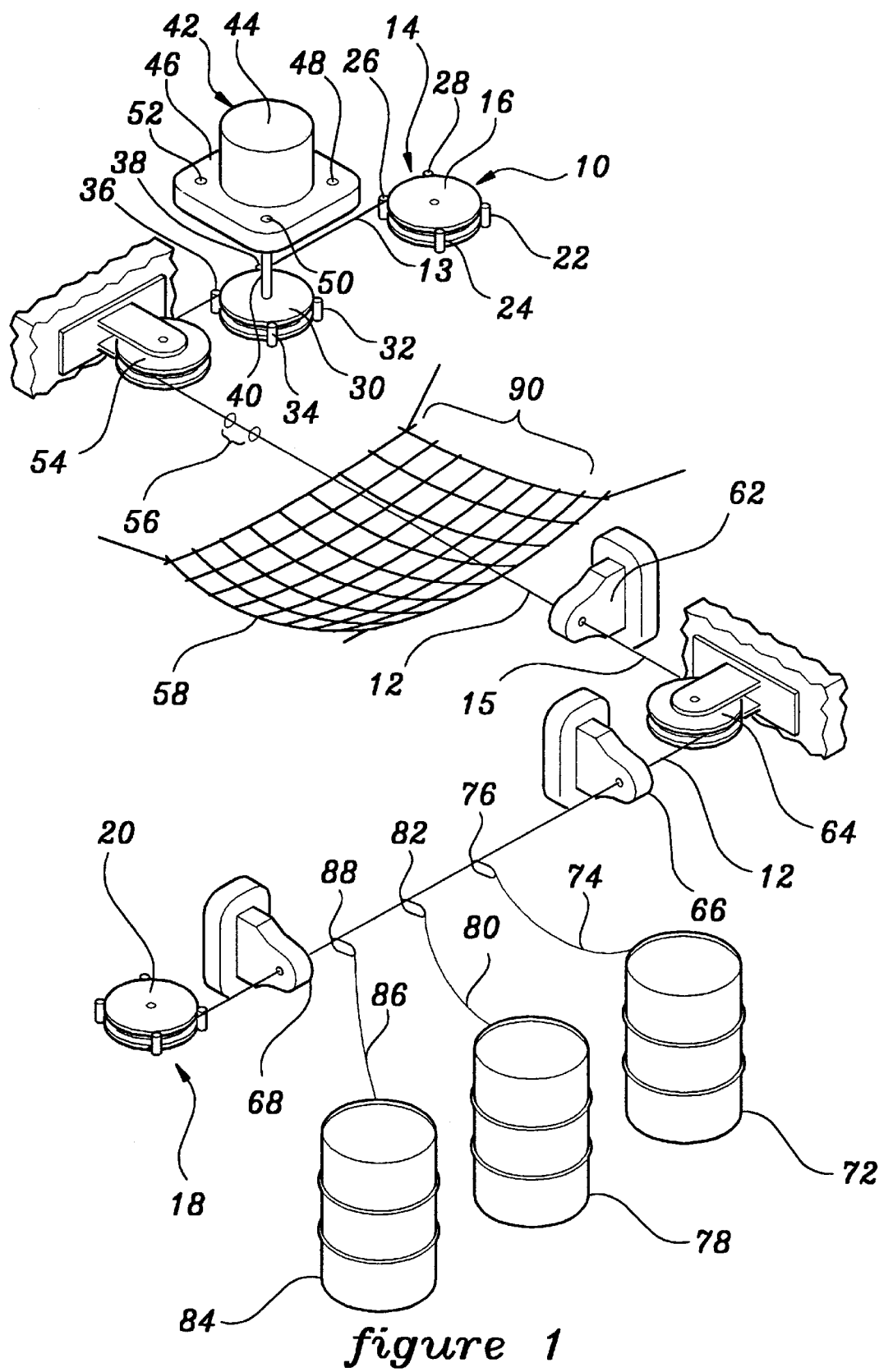
FIG. 1 illustrates a multiple embodiment of a velocity-discriminating cable transducer system of the present invention which utilizes sacrificial link variants, netting variants, guide bushing variants, and stationary object variants.

Referring to the accompanying drawings in which like reference numbers indicate like elements, FIG. 1 shows a multiple embodiment of a velocity-discriminating cable transducer system, shown generally at 10, of the present invention which utilizes sacrificial link variants, netting variants, guide bushing variants and stationary object variants. In particular, system 10 includes sensing cable 12 wrapped at first end, shown generally at 14, about first spring reel 16 and wrapped at second end, shown generally at 18, about second spring reel 20. First, second, third and fourth guide pins, 22–28 respectively, of first spring reel 16 are disposed in close proximity to spool 30 to prevent sensor cable 12 from disengaging laterally from spring reel 16.

Between first spring reel 16 and second spring reel 20, sensing cable 12 is wound around spool 30. First, second, third and fourth spool guide pins, 32–38 respectively, are disposed in close proximity to first spring reel 16 again to prevent sensor cable 12 from disengaging laterally. Spool 30 and shaft 40 rotate about a common axis. Shaft 40 is connected to encoder assembly shown generally at 42 which comprises encoder 44 having flange 46 equipped with mounting holes 48–52. Encoder assembly 42 is firmly anchored to its surrounding.

Thus, first spring reel 16 tensions sensing cable 12 with a few pounds of constant tension. Sensing cable 12 then wraps around spool 30 to rotate encoder 44. Sensing cable 12 continues through a series of elements until it is anchored by a second spring reel 20.

Referring again to FIG. 1, sensor cable 12 is also in contact with first pulley 54. First pulley 54 is preferably a ball bearing pulley anchored firmly to its surroundings. Sensor cable 12 has a first cable portion 13 connected to one end of sacrificial link shown generally at 56 and a second cable portion 15 connected to the other end of sacrificial link 56. Sensor cable 12 is preferably a low stiffness, low stretch material such as fine steel cable, nylon sheathed bronze cable, or nylon sheathed Kevlar cord. Sacrificial link 56 may be a fishing leader, a bent piece of wire, or any other material which is set to release or fail at a force a few pounds higher than that normally produced by either of the two spring reels, 16 and 20.

Second cable portion 15 then extends through net 58 suspended at four corners, first guide bushing 62, second pulley 64, second guide bushing 66, third guide bushing 68, and wraps around second spring reel 20.

One of many possible configurations is shown, where the sensing line passes near the center of the net, weaving under one web of the net to couple to the center of the net. It also passes through a hole in the net one time near where the sensing line first encounters net, and once near where the line later encounters the net. This is accomplished by installing sensing line so that it passes though the near and far edges of the net without touching the net, or as close to this as possible; then unthreading one side of the sensing line from the net, threading it under one net web near the net center, and rethreading the sensing line through the original far hole. This places as little of the weight of the net as possible on the sensing line, keeping the friction loading effects on the sensing line to a minimum.

Guide bushings, 62, 66 and 68, which are firmly anchored to their surroundings (i.e. mounted to rigid mounting posts) are preferably coated with a low friction material such as Teflon or nylon, or are made from polished metal. Guide bushing 62, 66 and 68 serve to support sensing cable 12 for a long, nearly straight run while amplifying the pulling effect of any object contacting the sensing line laterally.

First stationary object 72 is tethered to sensor cable 12 via first tether 74 and first connector 76 that is preferably a slidable ring connector. Similarly, second stationary object 78 is tethered to sensor cable 12 via second tether 80 and second connector 82.

In operation, a section of sensor cable 12, as in middle section 90, is placed adjacent a high-volume manufacturing process, preferably next to or under a conveyor belt (not shown). Middle section 90 spans the area occupied by net 58 and the area occupied by net 58 is preferably wider than the conveyor belt. When product (not shown) falls from a conveyor belt, it is caught by net 58. The momentum of the product encountering net 58 shakes net 58 and causes displacement of sensor cable 12.

However, sensor cable 12 is constrained to move in a generally linear fashion as constrained by first, second, and third bushings, 62, 66, 68, respectively, and by first and second pulleys 54 and 64 respectively. As sensor cable 12 moves linearly, spool 30 rotates because sensor cable 12 is wrapped about spool 30. As a result, shaft 40 also rotates, providing an input to encoder 44. As a result of the input, encoder 44 produces an output which is communicated to the microprocessor 100, shown generally in FIG. 7.

In a stationary object embodiment, here combined with the guide bushing embodiment, of FIG. 1, stationary objects 72, 78, and 84 respectively are monitored. Specifically, if stationary objects 72, 78, and 84 fall or are moved any appreciable distance, first, second and third tethers, 74, 80, and 86 respectively, will move sensor cable 12, and linear movement of sensor cable 12 will result in an output from encoder 44. Thus, there should be a minimum of tension on tethers 74, 80 and 86 to minimize the friction loading on sensing cable 12.

Second spring reel 20 and first spring reel 16 are provided with a sensing cable 12 having a total wraparound length greater than the maximum sensing cable 12 length change caused by the worst case object motion for the particular installation. However, it is noted that second spring reel 20 may not be needed if first spring reel 16 has enough length of sensing cable 12 wrapped therearound. Second spring reel 20 has a cable tension at least a few pounds above the value of the tension that first spring reel 16 can provide so that second spring reel 20 will not unwind unless first spring reel 16 has completely unwound.

Accordingly, encoder assembly 42 provides input to a circuit board with a microcontroller 100 on it that uses the motion of encoder 44 to determine when to drive lamps, buzzers, and/or relays based on algorithms in the program of the microcontroller.

Figure 2:
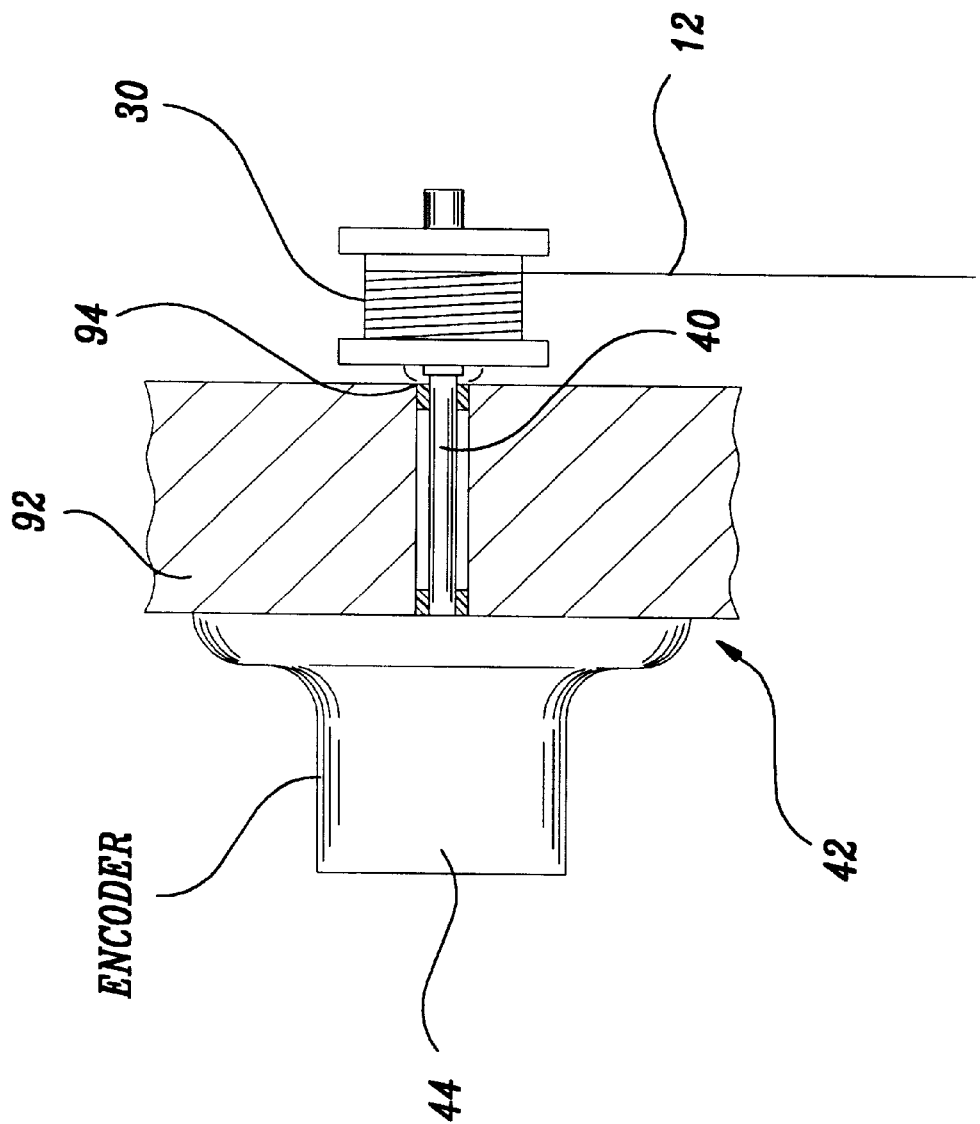
FIG. 2 illustrates a side plan and partial cutaway view of an alternate embodiment of the encoder and spool shown in FIG. 1 of the present invention.

FIG. 2 illustrates a side plan and partial cutaway view of an alternate embodiment of the encoder 44 and spool 30 shown in FIG. 1. The use and configuration of encoders 44 and spools 30 are well known in the art, and vary widely. Sensor cable 12 is shown wrapped around spool 30 in the same manner as in FIG. 1. Encoder 44 is bolted to a foundation 92 just as contemplated, but not shown, in FIG. 1. Foundation 92 may be an insulating material for providing insulation from liquids, gases, chemicals, or temperature differences. In FIG. 2, an environmental seal 94 is provided between spool 30 and foundation 92. Thus, FIG. 2 represents an alternate embodiment in which the invention may be utilized in harsh environments. By use of environmental seal 94, the encoder 44 and microprocessor 100 shown in FIG. 7 may be separated from the harsh environment in which spool 30 and cable 12 operate. The harsh environment may be a highly humid area, a liquid immersion, a chemically active environment, a highly hot or cold area, or the like. As in FIG. 1, the embodiment of FIG. 2 still provides an output (not shown) from encoder 44 which is communicated to microprocessor 100.

Figure 3:
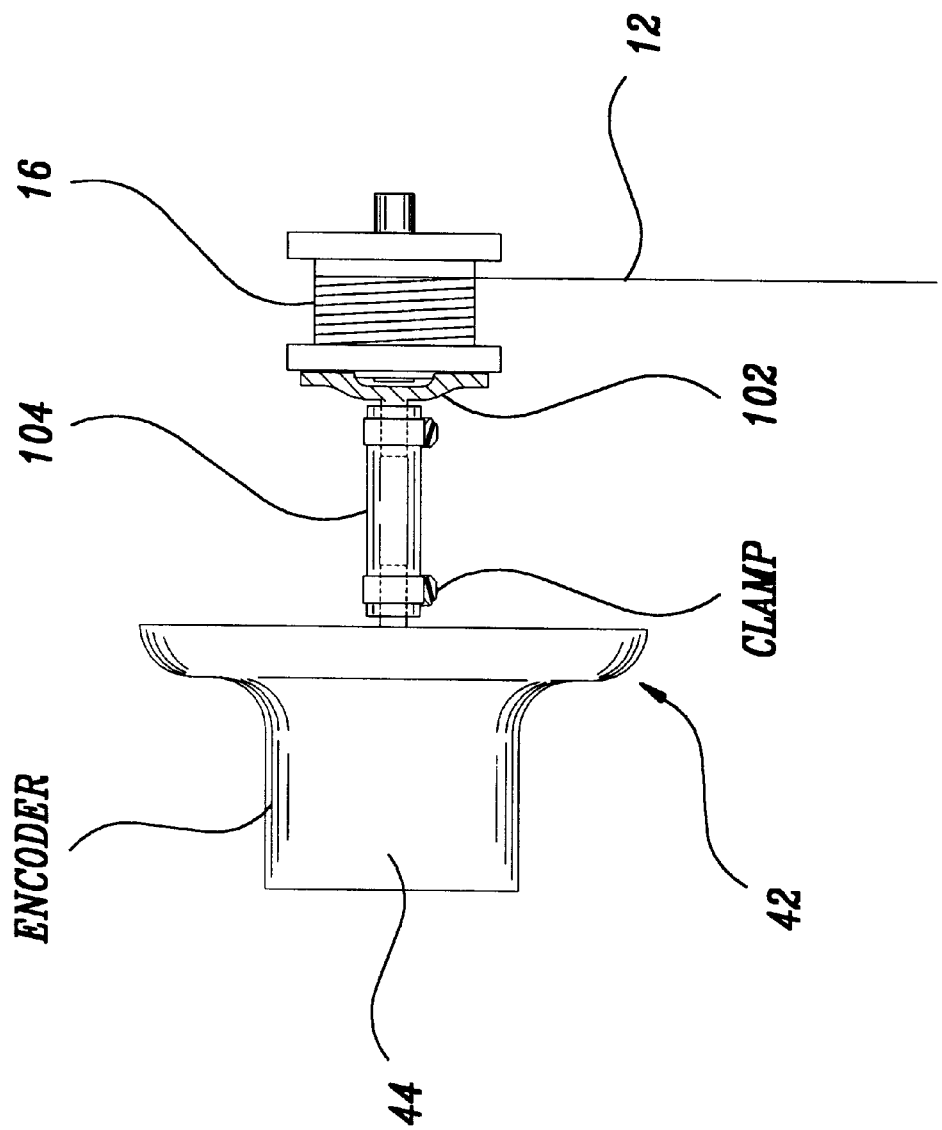
FIG. 3 illustrates a side plan and partial cutaway view of yet another alternate embodiment utilizing an encoder and spring reel combination with a flexible coupling.

FIG. 3 illustrates a side plan and partial cutaway view of yet another alternate embodiment. In this embodiment, no spool is required. Instead, first spring reel 16 is provided with a first spring reel cap 102 and a flexible coupling 104 is attached at one end to spring reel cap 102. The other end of flexible coupling 104 is attached to encoder assembly 42. As in FIG. 1, the embodiment of FIG. 3 still provides an output (not shown) from encoder 44 which is communicated to microprocessor 100.

Figure 4:
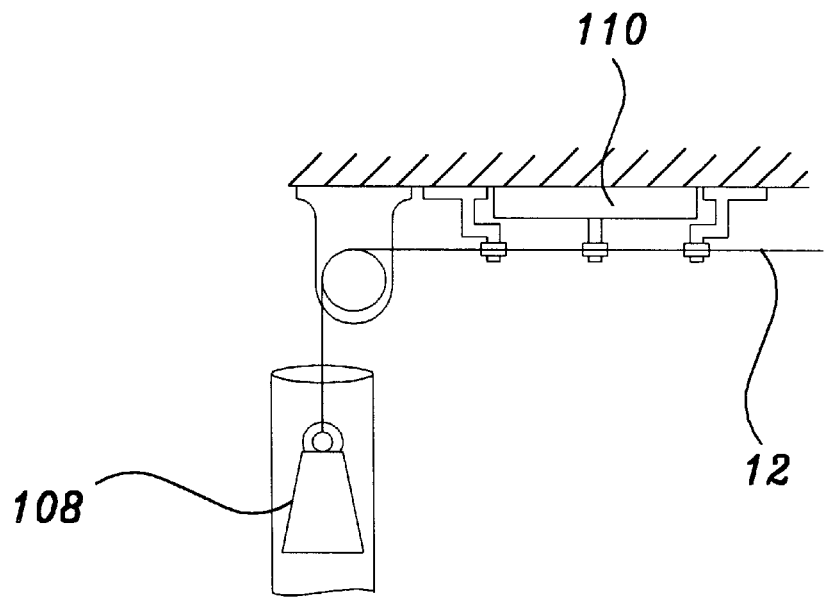
FIG. 4 illustrates a slide potentiometer embodiment of a velocity-discriminating cable transducer system.
Figure 5:
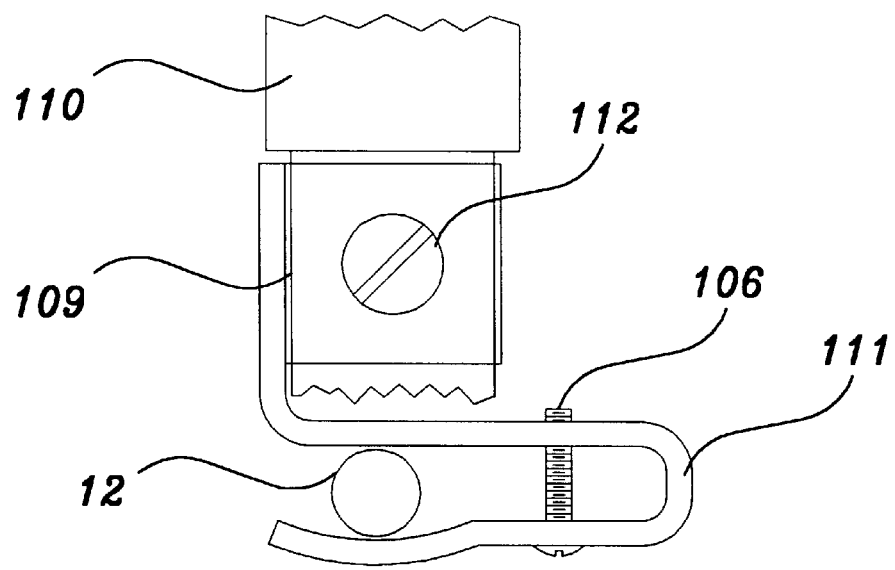
FIG. 5 illustrates an alternate cable attachment embodiment of the present invention.

FIG. 4 illustrates a side plan view of a slide potentiometer embodiment of a velocity-discriminating cable transducer system. It should be noted that both the encoder approach of FIG. 1 and the slide potentiometer approach of FIG. 5 are based upon reading the cable position often. While the embodiment of FIG. 1 utilizes first spring reel 16 and second spring reel 20 as tension devices, a weight 108 may be alternately used as a tension device to provide tension in sensor cable 12.

Velocity is calculated by knowing the amount of time elapsed between two different cable positions. The low velocity rejection feature is implemented by subtracting up to one position unit from any motion that happens within a selected time interval. This produces a new virtual or relative output of the encoder/potentiometer (relative to a floating reference position) that has any motion (such as low velocity motion) below the selected amount already subtracted off. This new output is basically in the form of a set of positions over time, just like the original outputs. Accordingly, anything that could be done to the original outputs can be done to this. That is why a threshold for the alarm can be set for a position value, as in the preferred invention, or a velocity, as in the less preferred invention.

There are many ways to characterize a sequence of position values in time. A minimal definition of a motion requires that there be some change in position that occurs over an interval of time. Quantifying this motion with a motion value can be done by looking only at two or three position values at certain times, calculating instantaneous velocity or acceleration quantities, and then defining a motion value as the magnitude of these quantities. Alternatively, a graph of position against time can be treated as a waveform that can have circuit-type filtering function applied to it. Alternatively, a graph of position against time can form the basis for a two-dimensional image that can have machine-vision-type structuring elements applied to it. In the graphing cases, the modified graph would be input to an evaluation function that extracts a single number quantifying a motion value based on concepts such as fixed-width time windows, integration, or age-weighted averages. Accordingly, it would be accurate to describe, in a generic sense, the microprocessor 100 as calculating a motion value from an encoder 44 signal and that this motion value may be compared against a limit to change a binary output when the limit is exceeded.

There are various reasons why a position threshold is preferred over a velocity threshold in a high-volume manufacturing environment. For example, conveyor belts in high-volume manufacturing environments can move slowly or rapidly. This range of velocity makes a velocity threshold difficult to select. In contrast, selecting a cable deflection position for the alarm threshold is much less difficult. In addition, a velocity threshold could be very sensitive to small fast moves, such a vibration, creating more highly undesirable false alarms.

FIG. 5 illustrates a friction clip used to attach slide 109 of the slide potentiometer 110 embodiment of a velocity-discriminating cable transducer system to cable 12. Screw 112 is used to hold clip 111 to potentiometer slide 109. Screw 106 is used to adjust the amount of friction between clip 111 and cable 12.

In the first embodiment, spool 30 and encoder assembly 42 (including encoder 44) operate together to form a linear displacement sensing device. Thus, there is illustrated in FIGS. 4 and 5 an alternate linear displacement sensing device in the form of slide potentiometer 110 and friction clip 111.

Figure 6:
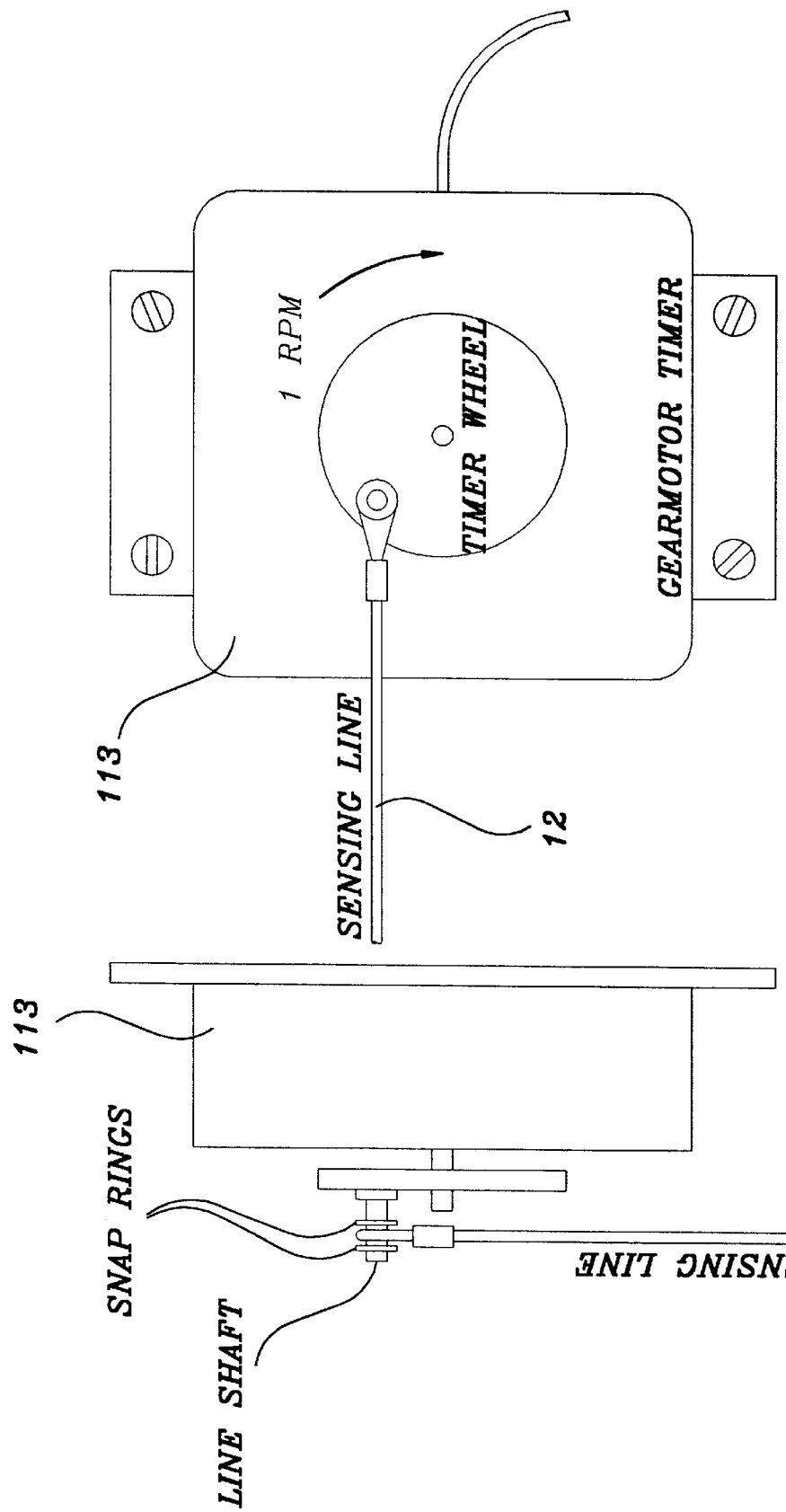

FIG. 6a illustrates a side plan view of a gearmotor timer embodiment of the present invention and FIG. 6b illustrates a front plan view of the gearmotor timer embodiment of FIG. 6a. Gearmotor timer 113 is a repetitive motion device and preferably utilizes a 1 RPM timer wheel which can keep the encoder in continuous motion. In other words, gearmotor timer 113 applies a repetitive motion to sensing cable 12. As a result of the 1 RPM timer wheel, sensing cable 12 is in continuous motion and results in one of two square wave edges generated by encoder 44 approximately every 10 seconds. Encoder 44 is for example manufactured by Oak Grigsby 90Q128-00-00, and produces two square waves, WF1 (waveform 1) and WF2 (waveform 2), in quadrature to each other. As the encoder wheel (not shown) connected to encoder shaft 40 is rotated, two sensors in encoder 44 pick up the light (or transparent) and dark stripes that radiate from the center of the encoder wheel as high and low voltages, creating the two square wave signals that correspond directly to motion of encoder shaft 40. These signals are connected directly to the input of microcontroller 100 (the term "microprocessor" and "microcontroller" are synonymous and are used interchangeably). These quadrature signals are directly read by the program in microcontroller 100. The term "quadrature" refers to the four combinations of black-black, black-light, light-light, and light-black that may be sensed by encoder sensors. These four combinations enable direction of rotation to be determined. This program uses the quadrature signals to calculate the current position of sensing cable 12, then computes a virtual position after all motion below a selectable threshold is subtracted out. The program also compares this virtual position with a threshold to determine when to set outputs to LED's, a buzzer, and a relay. Two manual push-buttons are also read to allow the user to select the program's mode of operation.

The control program comprises eight modules that reside in the Read Only Memory of microcontroller 100. Preferably, microcontroller 100 is a Microchip Technologies PIC16F84. The program runs in an infinite loop, continuously calling the various program modules one after the other at a high rate of speed. Each program module may look at a timer value and determine not to run that time, or it can run for a very short time, less than 300 microseconds, before returning control to the infinite loop. At the beginning of the infinite loop, all program module variable are set to initial values to appear to the other program modules that the system has already been running smoothly.

Microprocessor 100 starts a timer that is reset whenever the square wave changes, but that times out after a predetermined value of no square wave changes. Preferably, the predetermined value is 10 seconds of no square wave changes. This allows an alarm to be sounded to indicate that the system is not operating reliably, yielding a system that is more reliable than the simple cable pull switch trip wire approach often used which can be deactivated by mechanical failures.

Figure 7:
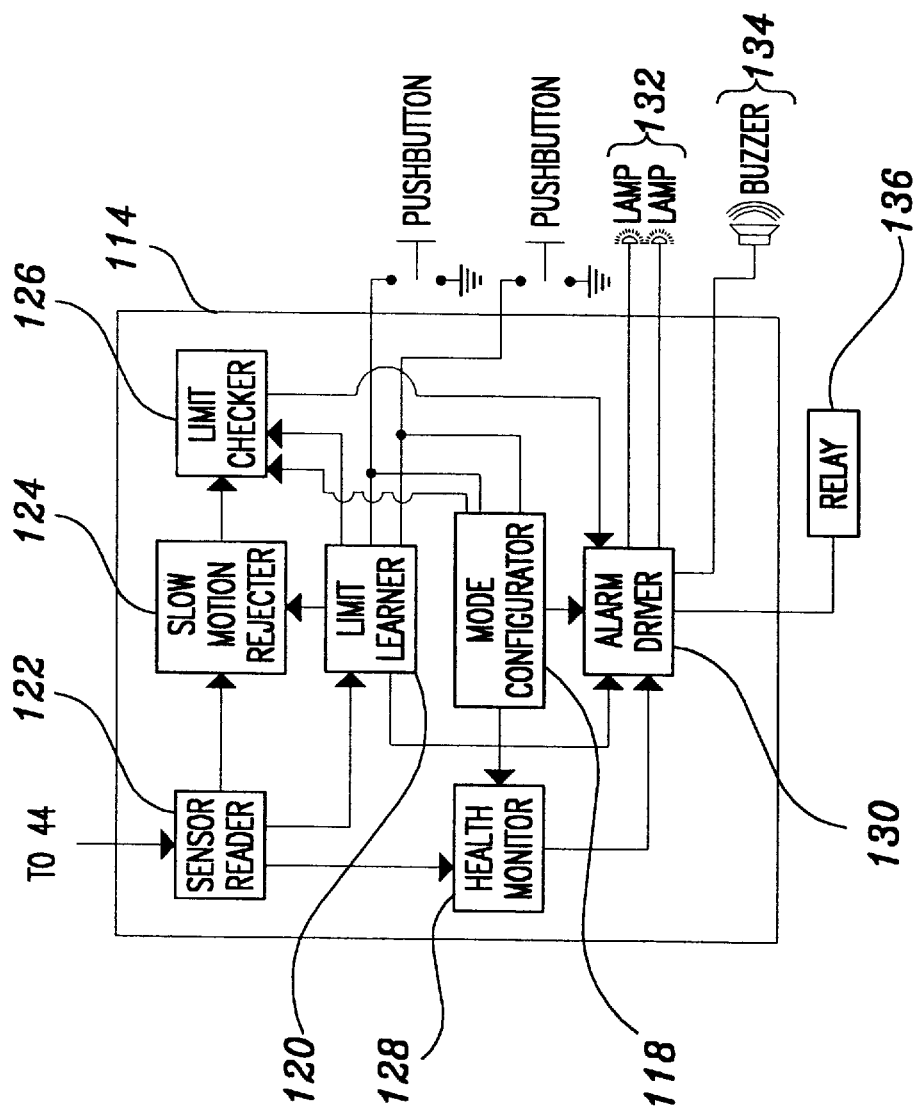
FIG. 7 illustrates a block diagram view of the functions performed by the microprocessor of the present invention.

FIG. 7 illustrates a block diagram view of the eight software modules and their interactions provided within microprocessor 100 of the present invention. The modules are shown on circuit board 114. The software modules include initialization module 116, mode configurator module 118, limit learner module 120, a sensor reader module 122, a slow motion rejector module 124, a limit checker module 126, a health monitor module 128, and an alarm driver module 130. Outputs from the board include lamp 132, buzzer 134, and relay 136. It is contemplated that system 10 is a stand alone system. Thus, sensory outputs 132 and 134 are important. However, relay 136 may be used to provide an input to a network or network controller (not shown) to provide further coordination within the manufacturing area and to provide information to management information systems.

FIGS. 8–12 illustrate a software flow chart for initialization module 116, mode configurator module 118, limit learner module 120, sensor reader module 122, slow motion rejector module 124, limit checker module 126, health monitor module 128, and alarm driver module 130 for microprocessor 100 of the present invention.

Figure 8:
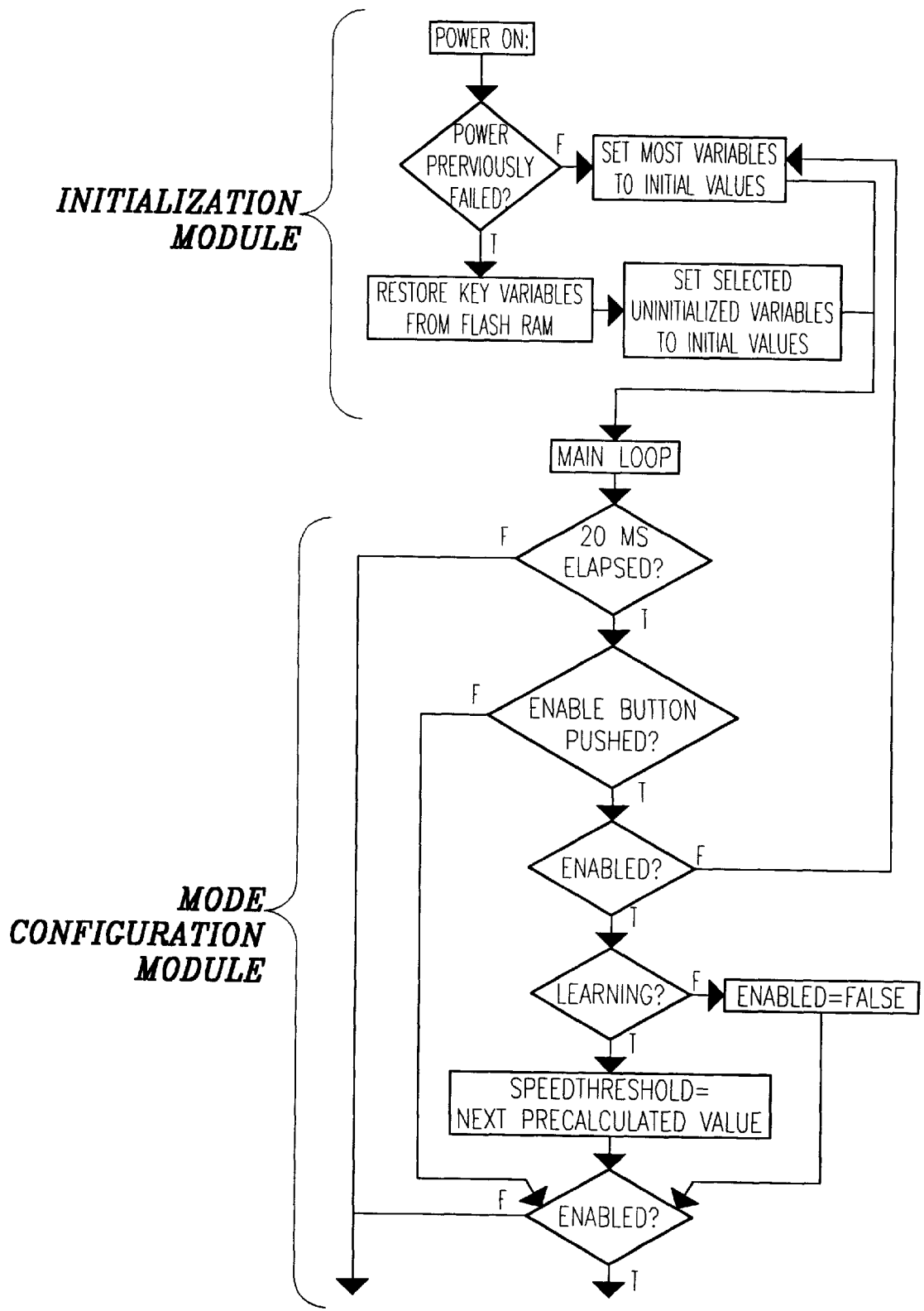
FIG. 8 illustrates a software flow chart for an initialization module and portion of a mode configuration module for the microprocessor of the present invention.

As shown in FIG. 8, initialization module 116 is run only once when the power is initially turned on. The purpose of initialization module 116 is to set the value of various variables. Normally, selected variables are set to initial values. However, if the power had previously failed, certain key variables are assigned values from flash RAM with the remaining selected variable set to initial values.

Figure 9:
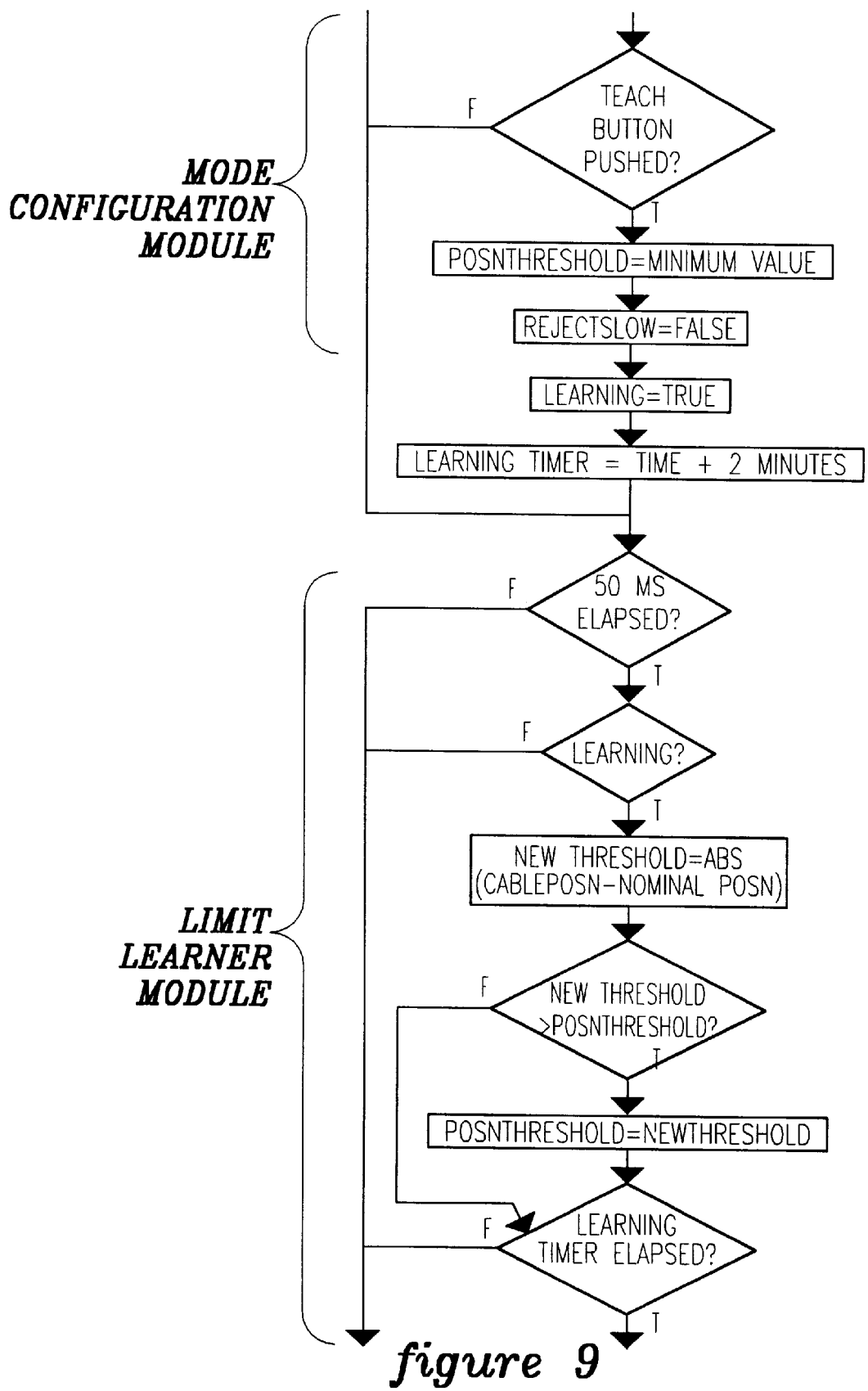
FIG. 9 illustrates a software flow chart for the remainder of the mode configuration module and a portion of a limit learner module for the microprocessor of the present invention.

Mode configuration module 118 shown in FIGS. 8–9 is run approximately 50 times per second. This module checks or polls for operator input at either push-button, ENABLE or TEACH. If ENABLE is detected as pushed, the variable ENABLED is toggled between TRUE and FALSE. The TEACH push-button is only checked if ENABLED is TRUE. If the TEACH push-button is pushed, then the LEARNING variable is set to TRUE, and a timeout timer for learning is started (LEARNING TIMER). When LEARNING TIMER has timed out in 1 to 5 minutes, LEARNING is set to FALSE and normal sensing operation resumes. If the ENABLE push-button is detected while LEARNING is TRUE, then the next of three decreasing precalculated constants is loaded in the variable SPEEDTHRESHOLD. If more than two button pushes are detected, the first constant is reloaded, and the selection process continues with decreasing values, as before. The three constants are chosen for a particular type of application, and can be customized for different specialized application. A generic model with constants around 4000 milliseconds, 400 milliseconds, and 4 milliseconds would cover most applications.

Figure 10:
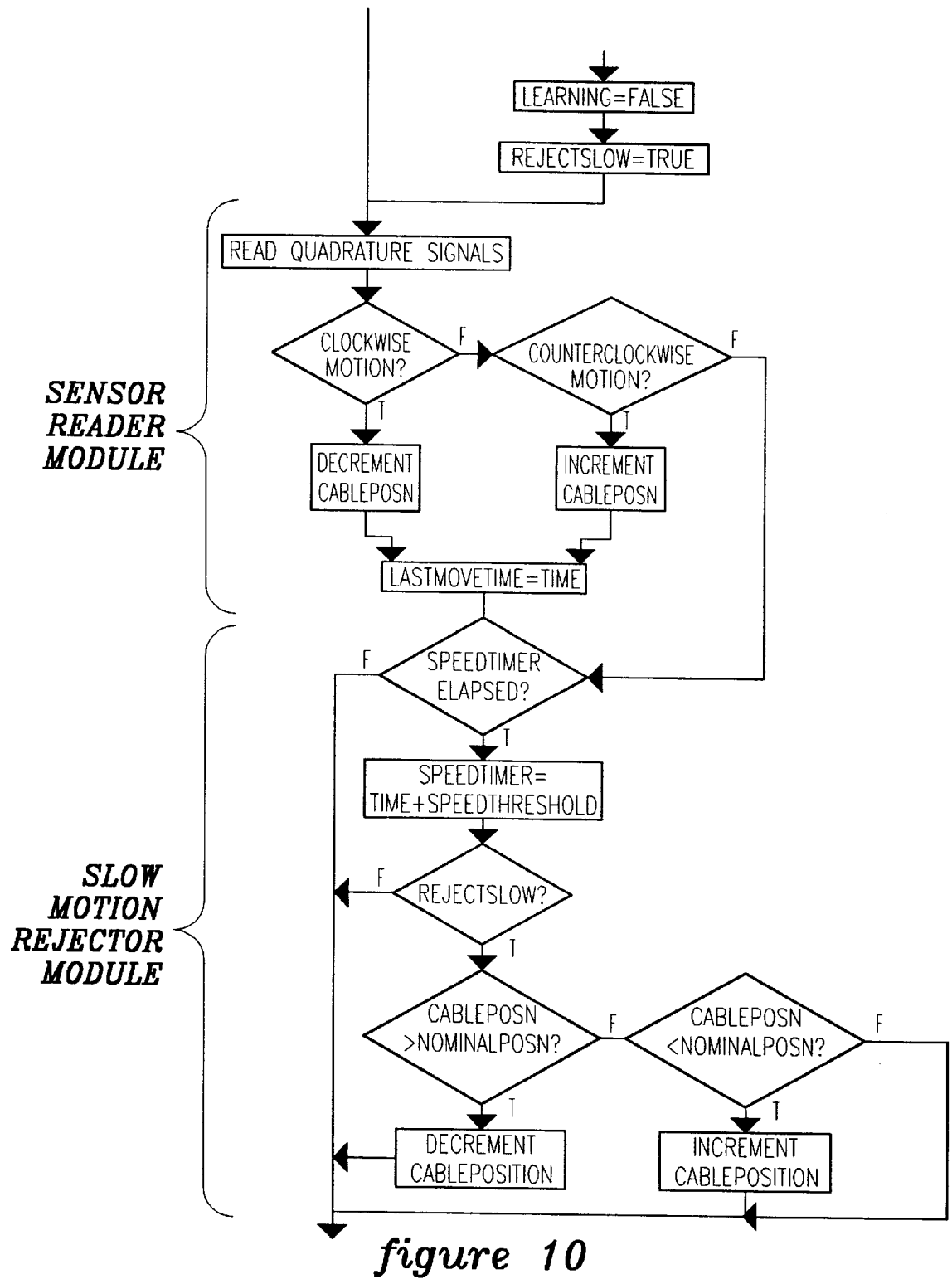
FIG. 10 illustrates a software flow chart for the remainder of the limit learner module, a sensor reader module, and a slow motion rejecter module for the microprocessor of the present invention.

As shown in FIGS. 9–10, limit learner module 120 is run approximately 20 times per second. This module examines the LEARNING variable set by mode configurator module 118. The first run that the LEARNING variable becomes TRUE, POSNTHRESHOLD is set to the minimum allowable (most sensitive) position threshold value. From then on while the LEARNING variable is true, limit learner module 120 computes a variable NEWTHRESHOLD=absolute value of (CABLEPOSN-NOMINALPOSN). Slow motion rejector module 124 is also off during this period to avoid interference with the calibration. If this value is greater than POSNTHRESHOLD, then it sets POSNTHRESHOLD= NEWTHRESHOLD. The LEARNING value is typically true for 1 to 5 minutes, long enough to let the operator manipulate the sensing line to the least displaced position at which he wants an alarm to be declared. The farthest travel of sensing cable 12 will thus become the newly taught POSNTHRESHOLD value.

As shown in FIG. 10, sensor reader module 122 runs every time through the loop and reads the two quadrature square waves from encoder 44. It compares two binary inputs with the last two read and does nothing if the values have not changed. If the values have changed, the module updates the CABLEPOSN variable depending upon the direction of motion. Thus, the module 122 determines a motion value upon displacement of sensor cable 12.

Slow motion rejector module 124 shown in FIG. 10, runs once every SPEEDTHRESHOLD milliseconds. This time can be many seconds for a sensing cable 12 with very slowly changing length. Its operation is simple: if CABLEPOSN is greater than the initial value (NOMINALPOSN), then subtract 1 from CABLEPOSN; if CABLEPOSN is less than NOMINALPOSN, then add 1 to CABLEPOSN. This module 124 is always trying to drive CABLEPOSN to the value of NOMINALPOSN. Thus, the motion value is a linear displacement value (position value) having a virtual position output calculated relative to a floating reference position by subtracting off the effects of low velocity motion from an absolute cable position value.

Figure 11:
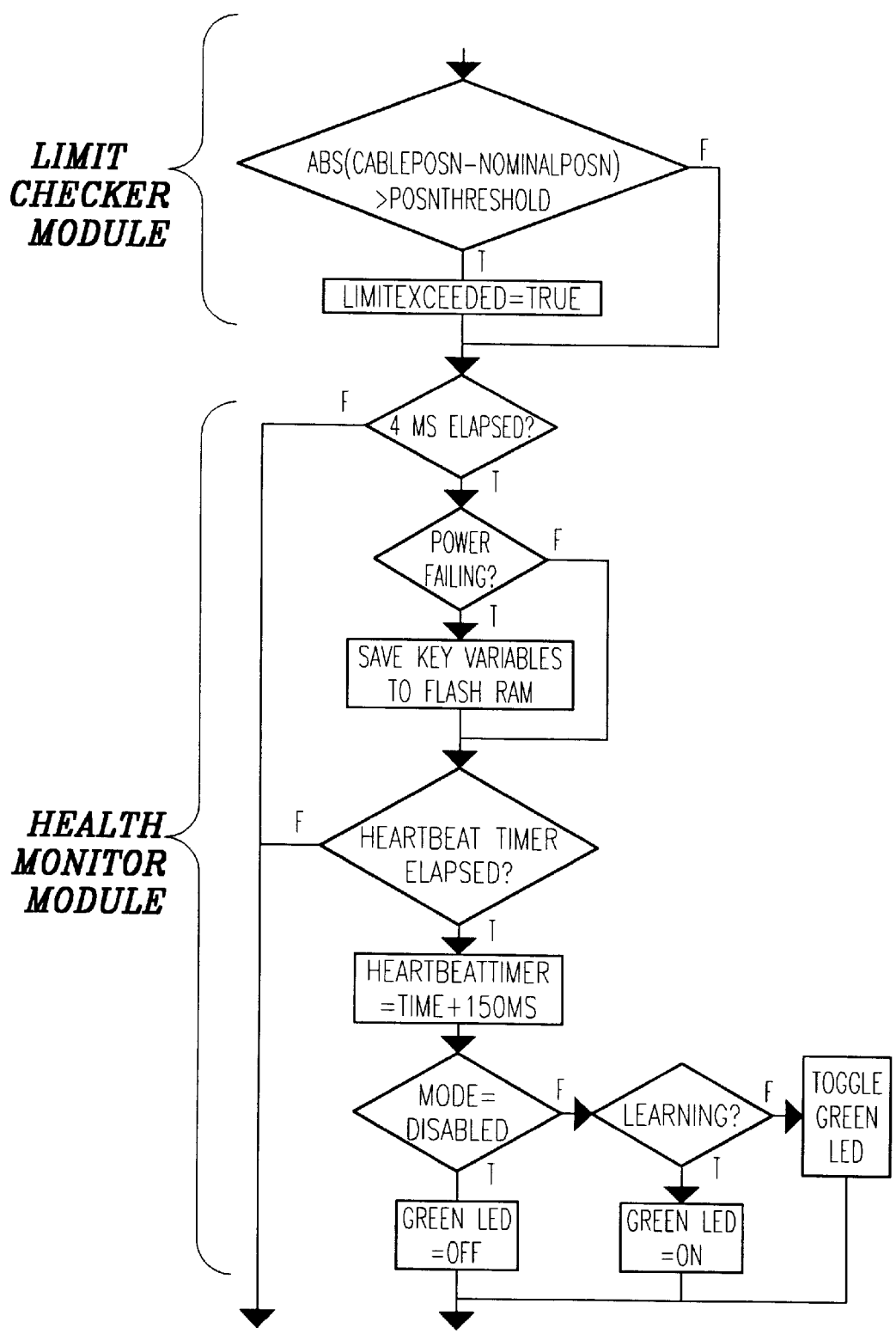
FIG. 11 illustrates a software flow chart for a limit checker module, and a portion of a health monitor module of the present invention.

As shown in FIG. 11, limit checker module 126 runs in each program loop. If the absolute value of (CABLEPOSN−NOMINALPOSN) is greater than POSNTHRESHOLD, then the module sets LIMITEXCEEDED=TRUE; otherwise, LIMITEXCEEDED is not changed. LIMITEXCEEDED may latch to a true state here, causing an alarm to sound until being cleared when the enable button is pushed. POSNTHRESHOLD is the length of change in sensing cable 12 permitted before an alarm is declared. Thus, a binary output signal is changed when the motion value (here a position value) exceeds the limit.

Figure 12:
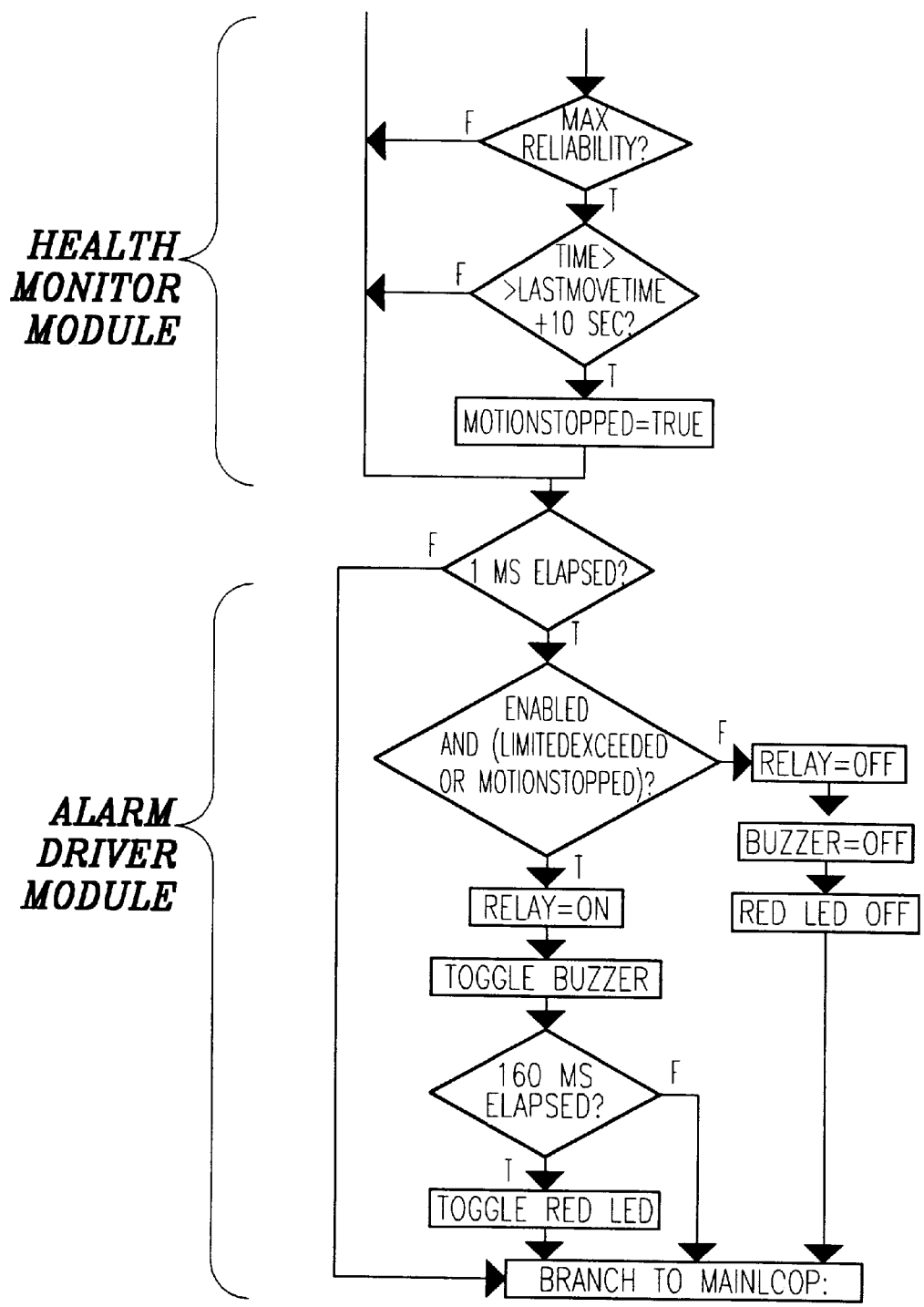
FIG. 12 illustrates a software flow chart for the remainder of the health monitor module and an alarm driver module for the microprocessor of the present invention.

As shown in FIGS. 11–12, health monitor module 128 reads the Power Fail signal input, and sets the POWERFAIL variable equal to this level. When POWERFAIL becomes TRUE, key variables are saved to nonvolatile memory to be retrieved by the initialization module 116 when power returns. It also turns on the Green LED every ⅙ seconds and turns it back off ⅙ seconds later. This gives a visible "heartbeat" indication that the software is operating properly and the system is not in the DISABLED mode. Whenever the LEARNING variable is set, the green LED is left on. It is noted that an embodiment utilizing gearmotor timer is contemplated. For this embodiment, an additional feature may be provided in health monitor module 128. The module 128 checks the raw encoder input if the MAXIMUM RELIABILITY flag is configure to true. In this case, if the encoder signal does not a transition indicating motion for approximately 10 seconds, it sets the MOTIONSTOPPED variable to cause an alarm.

Alarm driver module 130 shown in FIG. 12 preferably is run approximately 1000 times per second. This module 130 looks to see whether the LIMITEXCEEDED or MOTIONSTOPPED variables are TRUE; if so, the relay and beeper outputs are asserted, and the red LED output is also asserted. A timer is started (FLASHING TIMER) for a period of about ⅙ seconds, and at the end of that time, the red LED output is toggled. This continues every ⅙ seconds while LIMITEXCEEDED is TRUE. When LIMITEXCEEDED and MOTIONSTOPPED are FALSE, the red LED output is cleared.

Figure 13:
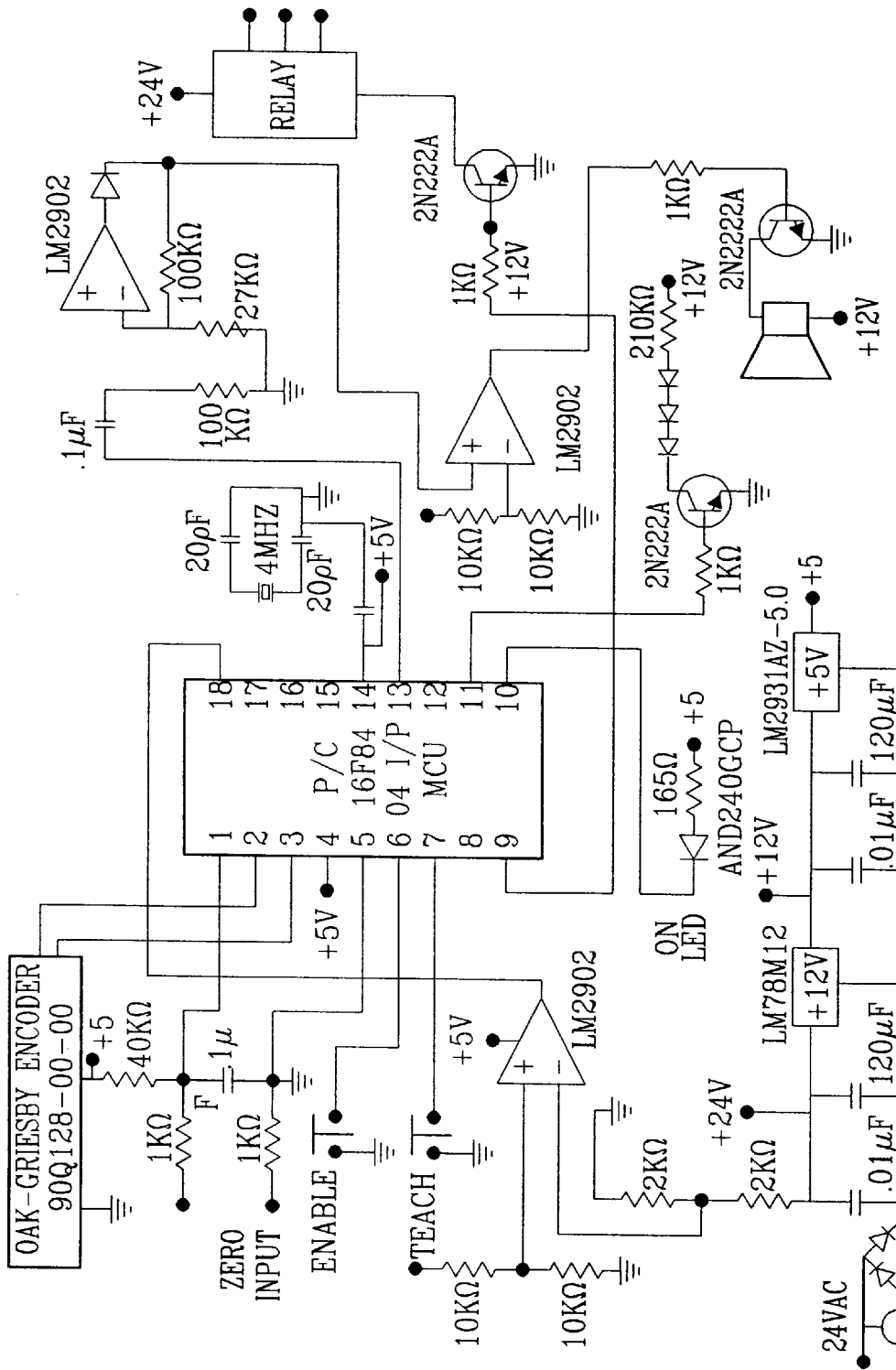
FIG. 13 illustrates an electrical schematic of the present invention.

FIG. 13 illustrates an electrical schematic of the present invention. The watchdog timer circuit is built around two of the op amps, and drives the buzzer output. The flow chart requires that the software toggles that output at a high rate of speed to keep the buzzer from sounding. This function is to support high reliability applications that probably would also use the 1-rpm motor on the end of the sense line to reduce the risk of undetected failure. The watchdog timer allows any fatal fault in the microprocessor hardware or software to be quickly signaled, before the system has time to miss sensing an important event. This is in keeping with the general principle in automation that safety-related functions are hard-wired, and do not depend on software.

An interesting result of combining a velocity-rejecting module with a position threshold is that the reference location from which the position threshold is judged moves with respect to the absolute position of the cable at the encoder.

Operation of the System

Sensing cable 12 is installed in an area where the user wants object motion detected when an object crosses a straight line such as where sensing cable 12 is threaded through guide bushings (e.g. guide bushing 62, 66 and 68), and/or when an object crosses a plane such as where sensing cable 12 is threaded through net 58, and/or when an object moves away from sensing cable 12 such as when tether 74, which is attached to stationary object 72, is connected to a ring or connector 76 that sensing cable 12 runs through. After all the components of system 10 are physically in place, the user presses the LEARN push-button that places the system into a special learning mode signified by the constant illumination of the green LED and the absence of its usual heartbeat flashing. During the several minutes that the system is in this mode, the user identifies an important section of sensing cable 12 such as the location where finest motion is being monitored, or in the center of the longest unsupported run of cable 12, or some other user-specific location. The user then physically displaces cable 12 the minimum distance that detection is desired at that selected location. In other words, the user teaches the system the desired position threshold (alternatively referred to as a "limit") by physically displacing sensing cable 12 to the desired position threshold or limit. Limit learner module 120 will read the value of displacement and will store this value as the new position threshold if the new value is larger than the last motion during the learning mode. After exiting from the calibration mode via timeout or via the user pressing the LEARN push-button again, the system 10 will set the present cable position to the nominal value and begin looking for motion using the new parameters.

The result of movement of sensing cable 12 in any of the applications discussed above is that sensing cable 12 wound around spring reel is pulled and unwinds from spring reel under approximately constant force. The spring reel cable, being wrapped around the spool, causes the spool to rotate, which then causes encoder shaft 40 to rotate.

When encoder shaft 40 rotates, a quadrature signal is produced and read by sensor reader module 122 of microprocessor 100. The signal is converted into a change in the sensing line position variable (motion value). This is resisted by slow motion rejector module 124 which tries to drive the position variable back to its nominal value at a rate equivalent to the speed rejection threshold. If the motion is fast enough, the sensing line position variable will change. When limit checker module 120 sees this change, it compares it against the position threshold. If the position threshold or limit is exceeded, limit checker module 120 signals alarm driver module 130 to change the hardware outputs of the system. In this implementation, this includes flashing the red LED, supplying 12 volt power to sound the buzzer, and supplying 12 volt power to energize the relay coil. The hardware outputs continue to be asserted until manually silenced by the user pressing the enable button. Optionally, a timeout occurs after a period of minutes or hours. Either reset method causes the system to redefine the current sensing line position as the nominal value, and resume monitoring for motion using all the previous parameters.

In view of the foregoing, it will be seen that the several objects of the invention are achieved and other advantages are attained. The embodiments were chosen and described in order to best explain the principles of the invention and its practical application to thereby enable others skilled in the art to best utilize the invention in various embodiments and with various modifications as are suited to the particular use contemplated. As various modifications could be made in the constructions and methods herein described and illustrated without departing from the scope of the invention, it is intended that all matter contained in the foregoing description or shown in the accompanying drawings shall be interpreted as illustrative rather than limiting. For example, the parameter output after velocity subtraction need not be position, but could be velocity or acceleration. Another modification falling within the scope of the present invention involves the amount of velocity subtracted. The amount of velocity subtracted could be learned, like the position threshold, from an example of line motion, and not simply selected. In another modification, a lower cost progressive force spring could replace the constant force spring reel. In yet another modification, nonvolatile memory could be used to allow the system to remember its setup through power failures or shutdowns. In addition, other types of computing engines could be used besides a microcontroller, such as a digital signal processor, a custom digital circuit, or a neural network chip. Rotary encoder 44 could be replaced by a rotary potentiometer or resolver. Linear potentiometer 110 could be replaced by a magnetostrictive or inductive coil type linear position sensor. A further modification could be that sensing cable 12 could be highly visible, larger diameter plastic sheathing a core of Kevlar, bronze, or steel; alternatively, its length could be maximized by using fine steel cable. Yet another modification is that the control buttons can be mounted remotely for user convenience when the transducer is not in an easily accessible place. A further modification is that encoder 44 may be integrated with spring reel 16. Another modification is using a repetitive motion device other than gearmotor timer 113 that provides a predictable repetitive motion. Thus, the breadth and scope of the present invention should not be limited by any of the above-described exemplary embodiments, but should be defined only in accordance with the following claims appended hereto and their equivalents.

What is claimed is:

1. A velocity-discriminating cable motion transducer system comprising:
    a first cable;
    a linear displacement sensing device attached to said first cable;
    a microprocessor connected to said linear displacement sensing device, said microprocessor being adapted to calculate a motion value upon displacement of said first cable, then to compare said motion value with a limit, and then to change a binary logic output signal when said motion value exceeds said limit wherein said motion value is a virtual position output calculated relative to a floating reference position by subtracting off the effects of low velocity motion from an absolute cable position value.

2. A velocity-discriminating cable motion transducer system comprising:
    a first cable;
    a linear displacement sensing device attached to said first cable;
    a microprocessor connected to said linear displacement sensing device, said microprocessor being adapted to calculate a motion value upon displacement of said first cable, then to compare said motion value with a limit, and then to change a binary logic output signal when said motion value exceeds said limit;
    wherein a motion amplifier is placed in contact with said first cable such that deflection in said motion amplifier causes deflection in said first cable.

3. A velocity-discriminating cable motion transducer system according to claim 2, wherein said motion amplifier comprises a net.

4. A velocity-discriminating cable motion transducer system according to claim 2, wherein said motion amplifier comprises a guide bushing defining a hole, wherein said first cable is disposed through said hole of said guide bushing.

5. A velocity-discriminating cable motion transducer system comprising:
    a first cable;
    a linear displacement sensing device attached to said first cable;
    a microprocessor connected to said linear displacement sensing device, said microprocessor being adapted to calculate a motion value upon displacement of said first cable, then to compare said motion value with a limit, and then to change a binary logic output signal when said motion value exceeds said limit; and
    a sacrificial link connected to said first cable for failing at low tension.

6. A velocity-discriminating cable motion transducer system according to claim 5, further comprises:
    a stationary anchor;
    a second cable having a first end and a second end;
    wherein one of said first and second ends of said second cable is connected to said stationary anchor and the other of said first and second ends of said second cable is connected to said sacrificial link.

7. A velocity-discriminating cable motion transducer system according to claim 6, further comprising:
    a repetitive motion device disposed in contact with said second cable for placing said second cable in repetitive motion;
    said microprocessor being adapted to detect a lack of said repetitive motion and, upon detection, being adapted to set a binary logic output.

8. A velocity-discriminating cable motion transducer system comprising:
    a first cable;
    a linear displacement sensing device attached to said first cable;
    a microprocessor connected to said linear displacement sensing device, said microprocessor being adapted to calculate a motion value upon displacement of said first cable, then to compare said motion value with a limit, and then to change a binary logic output signal when said motion value exceeds said limit;
    wherein said linear displacement sensing device has a spool in contact with said first cable and an encoder disposed in said spool, said encoder having an output in electrical communication with said microprocessor.

9. A velocity-discriminating cable motion transducer system according to claim 8, further comprising an environmental seal disposed between said spool and said encoder.

10. A velocity-discriminating cable motion transducer system comprising:
    a first cable;
    a linear displacement sensing device attached to said first cable;
    a microprocessor connected to said linear displacement sensing device, said microprocessor being adapted to calculate a motion value upon displacement of said first cable, then to compare said motion value with a limit, and then to change a binary logic output signal when said motion value exceeds said limit;
    a spring reel connected to said linear displacement sensing device for tensioning said first cable.

11. A velocity-discriminating cable motion transducer system comprising:
    a first cable;
    a linear displacement sensing device attached to said first cable;

a microprocessor connected to said linear displacement sensing device, said microprocessor being adapted to calculate a motion value upon displacement of said first cable, then to compare said motion value with a limit, and then to change a binary logic output signal when said motion value exceeds said limit;

a weight connected to said linear displacement sensing device for tensioning said first cable.

12. A velocity-discriminating cable motion transducer system comprising:

a first cable;

a linear displacement sensing device attached to said first cable having a slide potentiometer having an output in electrical communication with said microprocessor and a friction clip attached to said slide potentiometer, said friction clip being in contact with said first cable;

a microprocessor connected to said linear displacement sensing device, said microprocessor being adapted to calculate a motion value upon displacement of said first cable, then to compare said motion value with a limit, and then to change a binary logic output signal when said motion value exceeds said limit.

13. A velocity-discriminating cable motion transducer system comprising:

a first cable;

a linear displacement sensing device attached to said first cable;

a microprocessor connected to said linear displacement sensing device, said microprocessor being adapted to calculate a motion value upon displacement of said first cable, then to compare said motion value with a limit, and then to change a binary logic output signal when said motion value exceeds said limit;

a repetitive motion device disposed in contact with said first cable for placing said first cable in repetitive motion;

said microprocessor being adapted to detect a lack of said repetitive motion and, upon detection, being adapted to set a binary logic output.

14. A method for discriminating object motion by measuring motion of a cable disturbed by the moving object comprising:

disposing a cable in contact with a linear displacement sensing device having an output;

electrically connecting a microprocessor to said output of said linear displacement sensing device;

sending a signal from said linear displacement sensing device to said microprocessor upon movement of said cable;

determining from said signal a motion value with said microprocessor, by determining from said signal an absolute cable position value and subtracting the effects of low velocity motion from said cable position to determine a cable motion value comparing said motion value with a limit value;

changing a binary logic output when said limit value is exceeded;

whereby the state of the binary logic output indicates a status of the moving object.

15. A method for discriminating object motion by measuring motion of a cable disturbed by the moving object comprising:

disposing a cable in contact with a linear displacement sensing device having an output;

electrically connecting a microprocessor to said output of said linear displacement sensing device;

applying a repetitive motion to said cable;

sending a signal from said linear displacement sensing device to said microprocessor upon movement of said cable;

determining from said signal a motion value with said microprocessor, by determining from said signal an absolute cable position value and subtracting the effects of low velocity motion from said cable position to determine a cable motion value;

comparing said motion value with a limit value;

changing a binary logic output when said limit value is exceeded;

whereby the state of the binary logic output indicates a status of the moving object.

16. A method for discriminating object motion by measuring motion of a cable disturbed by the moving object according to claim 15, further comprising:

detecting the absence of said repetitve motion over a fixed time interval;

changing a binary logic output when an absence of said repetitive motion is detected.

17. A method for discriminating object motion by measuring motion of a cable disturbed by the moving object comprising:

disposing a cable in contact with a linear displacement sensing device having an output;

providing a motion amplifier that magnifies the effect of object motion on the motion of the cable;

electrically connecting a microprocessor to said output of said linear displacement sensing device;

sending a signal from said linear displacement sensing device to said microprocessor upon movement of said cable;

determining from said signal a motion value with said microprocessor, by determining from said signal an absolute cable position value and subtracting the effects of low velocity motion from said cable position to determine a cable motion value;

comparing said motion value with a limit value;

changing a binary logic output when said limit value is exceeded;

whereby the state of the binary logic output indicates a status of the moving object.

18. The method of discriminating object motion by measuring motion of a cable disturbed by the moving object according to claim 17, wherein the step of providing a motion amplifier comprises providing pairs of bushings spaced closely together.

19. The method for discriminating object motion by measuring motion of cable disturbed by the moving object according to claim 17, wherein the step of providing a motion amplifier comprises disposing said cable through a net.

20. A method for discriminating object motion by measuring motion of a cable disturbed by the moving object comprising:

disposing a cable in contact with a linear displacement sensing device having an output, by connecting a cable to a spool and connecting an encoder having an output to said spool;

electrically connecting a microprocessor to said output of said linear displacement sensing device;

sending a signal from said linear displacement sensing device to said microprocessor upon movement of said cable;

determining from said signal a motion value with said microprocessor, by determining from said signal an absolute cable position value and subtracting the effects of low velocity motion from said cable position to determine a cable motion value;

comparing said motion value with a limit value;

changing a binary logic output when said limit value is exceeded;

whereby the state of the binary logic output indicates a status of the moving object.

21. A method for discriminating object motion by measuring motion of a cable disturbed by the moving object comprising:

disposing a cable in contact with a linear displacement sensing device having an output, by placing said cable in contact with a friction clip and attaching said friction clip to a slide potentiometer having an output in electrical communication with a microprocessor;

electrically connecting a microprocessor to said output of said linear displacement sensing device;

sending a signal from said linear displacement sensing device to said microprocessor upon movement of said cable;

determining from said signal a motion value with said microprocessor, by determining from said signal an absolute cable position value and subtracting the effects of low velocity motion from said cable position to determine a cable motion value;

comparing said motion value with a limit value;

changing a binary logic output when said limit value is exceeded;

whereby the state of the binary logic output indicates a status of the moving object.

* * * * *